Aug. 8, 1933.   D. P. MOORE   1,921,984
COMBINED SUNSHADE AND HEADREST
Filed Aug. 4, 1932    2 Sheets-Sheet 1
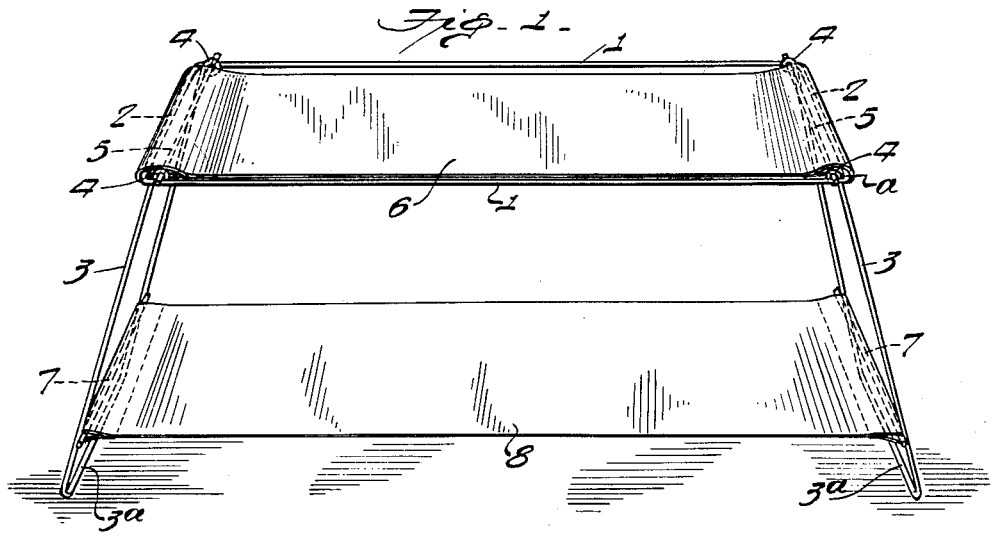
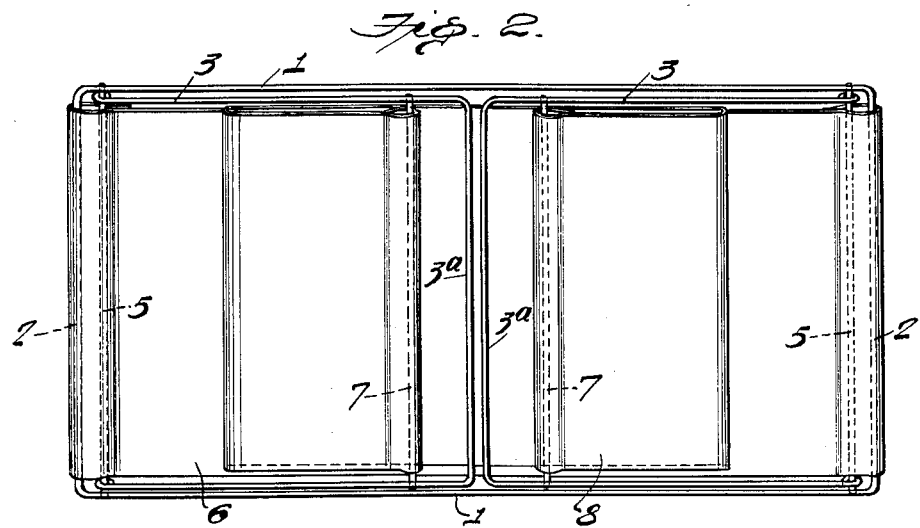
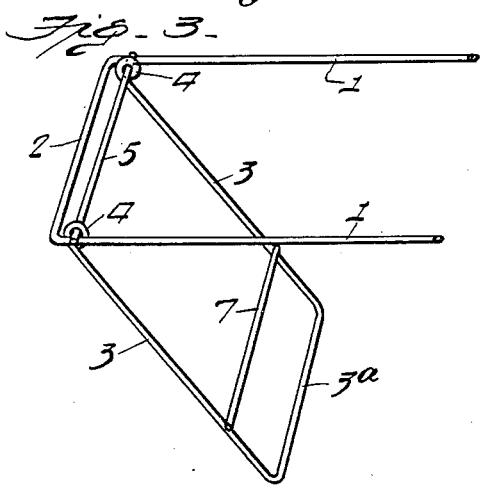
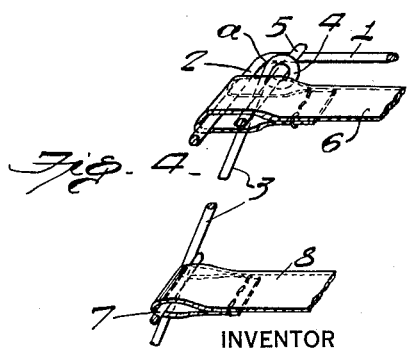
INVENTOR
David Pelton Moore Aug. 8, 1933.  D. P. MOORE  1,921,984
COMBINED SUNSHADE AND HEADREST
Filed Aug. 4, 1932  2 Sheets-Sheet 2
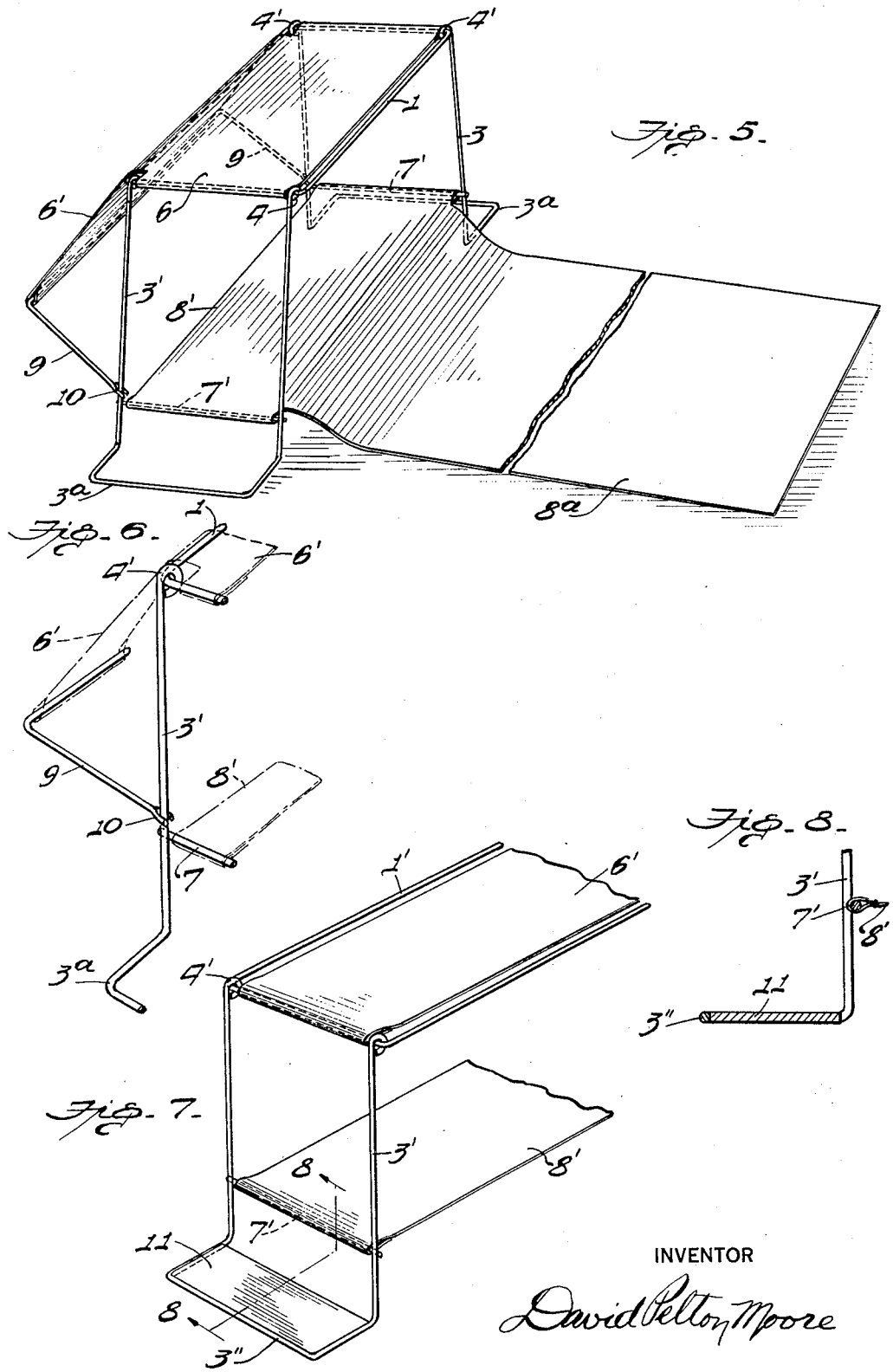
INVENTOR
David Pelton Moore Patented Aug. 8, 1933

1,921,984

UNITED STATES PATENT OFFICE 1,921,984

COMBINED SUNSHADE AND HEADREST

David Pelton Moore, Avon Park, Fla.

Application August 4, 1932. Serial No. 627,398

8 Claims. (Cl. 5—337)

It is a known fact that the sun rays are not too beneficial to the hair and the glare is not good for the eyes, and as the rays are beneficial to the body, it is the intention of this invention to provide a small collapsible sun-shade and head-rest for sun-bathers.

One object of the invention is the provision of a device of this character that is light in weight, so that it can be readily carried and set up at desirable places, and provide a comfortable head rest with a shade that will protect the head from the sun's rays, while the body is properly exposed in a reclining position.

Another object of this invention is the provision of a device of this type, in which the frame that carries the awning is the main carrying frame, while the head rest carrying members are pivoted thereto, so that when the device is set up, the head rest will be below the awning in a comfortably spaced position, and so that when they are folded toward each other, the head rest will be supported against and parallel to the awning in a compact shallow package, that can be readily carried and can be placed within or strapped upon a suit case.

In the accompanying drawings:—

Figure 1 is a front perspective view of the device as when in use.

Figure 2 is a bottom plan view thereof as when folded or collapsed.

Figure 3 is a fragmentary perspective view of one end of the shade carrying frame and one leg member, the latter being in an inwardly inclined position as when being collapsed.

Figure 4 is another fragmentary perspective view of one corner of the device showing the position the hinging elements assume when the device is in the position as shown in Fig. 1.

Figure 5 is a perspective view of a modified form of device set up for use and employing a reclining mat and rear sun shade.

Figure 6 is a fragmentary perspective view of the elements at one rear corner of the device shown in Fig. 5.

Figure 7 is a fragmentary perspective view of the frame at one end as in Fig. 5, with only a head rest in use.

Figure 8 is a section taken on line 8—8 of Fig. 7.

Referring to the drawings and particularly to Figs. 1 through 4, the numeral 1 designates a rectangular wire frame, having two end rods 2. Also welded to the frame 1 adjacent the ends thereof, and parallel to and spaced therefrom are the cross rods 5. Two U-shaped legs 3 are provided and each has a ground engaging foot rod $3^a$, and the terminal eyes 4, which pivotally connect their respective legs to the cross rods 5, so that when the legs are extended to support the frame 1 as shown in Figs. 3 and 4, the leg contacts at $a$ the end rod 2, and thus the end rod locks the leg against further outward movement. In this manner, the frame 1 with its sheet 6, which constitutes the awning or shelter for the occupant from the sun, is properly supported. A cross rod 7 is either welded to or frictionally slidable upon the two side members of the leg 3, parallel to and above rod $3^a$, and to this is attached the respective ends of the strip 8 of fabric, which constitutes the head rest, or a means to support a pillow, either of the pneumatic or padded type. This pillow may be carried bodily by the strip 8 or separate, or the strip 8 may be made of two layers in the form of a slip to receive either type of pillow.

From the foregoing it will be seen that when it is desired to fold the device as from Fig. 1 to Fig. 2, the device is bodily reversed and the strip 8 is folded against the underside of the strip 6, and the two legs 3 are swung inwardly toward each other to rest in close against the top frame, the ends of the leg members being sufficiently close together to permit the fingers of one hand to engage them at the upper corners while the hand grasps the adjacent portion of the frame 1. Thus the strip 8 folds nicely and neatly upon the shade 6 and between the leg members and a very compact and readily carried package results.

As shown in Fig. 5, where a prime is affixed to like numerals and parts as shown in Figure 1, the leg members 3' have off-set feet $3^a$, and these members are hinged as at 4' to the rectangular frame 1', which lacks the rods 5, the strip 8' being attached to the rods 7', and being provided with a cover strip $8^a$, to rest upon the ground to receive the reclining sun bather. This may be used, or merely the head-rest strip 8' as in Figs. 6, 7 and 8 may be used.

In Figs. 5 and 6, I have shown a rear sun shade 6', sewn at its upper edge to the frame 1', and attached at its free edge to the U-shaped frame 9, the terminals 10, of which are pronged so that the leg members 3' can be engaged as shown, to hold the shade 6' inclinedly, or when not in use the frame 9 and its shade may be swung up and upon the shade 6'.

Where so desired the strip 11 may be attached to and carried by the off-set feet members 3'' as in Figs. 7 and 8, and this provides a means to prevent the feet from sinking too deep in sand when the device is set up and in use, while the sheet 8' is of such a length as to limit the outward extension of the leg members when the device is set up for use.

From the foregoing description taken in connection with the drawings it is evident that there is provided a sun bather's device which is simple, durable and inexpensive in construction and thoroughly efficient and practical in use.

What is claimed, is:—

1. A device for sun-bathers including a shade member, two legs hingedly connected thereto for movements substantially at right angles or parallel thereto, and a flexible head rest carried by the legs and adapted when the legs are substantially at right angles to the shade member to lie substantially parallel to the shade member.

2. A device as claimed in claim 1, wherein there is cooperative means carried by the shade member and each of the legs to limit the extended right angled position of the legs.

3. A device for sun bathers, including a rectangular frame, a sun shade stretched thereon, two leg members pivotally connected to the frame, and a flexible strip forming a head rest connected to the leg members and adapted when the legs are extended and supporting the frame to lie directly below the sun shade.

4. A device as claimed in claim 3, wherein cooperative means are carried by the frame and leg members to limit the outward movement of the members when extended and to permit the folding inwardly of the leg members to be substantially parallel to the frame.

5. A device as claimed in claim 3, wherein there is a cross rod adjacent each end member of the frame and to which the leg members are pivoted, and wherein the cross rod limits the outward movement of the respective leg member.

6. A device as claimed in claim 3 wherein the frame includes a cross rod adjacent each end member thereof and in which the leg members each comprise a main substantially straight portion and terminate at their upper ends in eyes lying at one side of the main portion and encircling the respective cross rods to form the pivotal connection therewith and have the main portion extending downwardly between an end member and its adjacent cross rod whereby when extended the main portion of the leg member abuts its respective end member of the frame and is thereby held against further outward movement.

7. A device as claimed in claim 3, wherein the sun shade is provided with a rearwardly extending fly, and there is a support for the free edge thereof to engage the leg members and hold the fly extended.

8. A device for sun-bathers, including a rectangular open frame, two cross rods attached thereto, one parallel to and spaced from each end of the frame, two U-shaped leg members, the terminals of which are each provided with an eye so formed that the main portion of the leg member is at a tangent to the eye, the eyes of the terminals fitting upon the cross rods to swingingly mount the leg members thereon with the main portions thereof adjacent the ends of the frame and disposed to contact the ends of the frame when the leg members are extended, a strip of fabric stretched upon the frame and forming a sun shade, and a second strip of fabric having its ends connected to the leg members to form a head rest below the sun shade when the device is set-up.

DAVID PELTON MOORE.